United States Patent [19]
Galvin et al.

[11] Patent Number: 4,991,544
[45] Date of Patent: Feb. 12, 1991

[54] SEED GUARD FOR BIRD CAGES

[75] Inventors: David Galvin, 1176 Friar Tuck La., Dunedin, Fla. 34698; Tom Williamson, 1071 Lexington Ct., Largo, Fla. 34641; John S. TenBarge, Clearwater, Fla.

[73] Assignees: David Galvin, Largo; Tom Williamson, Dunedin, both of Fla.

[21] Appl. No.: 562,304

[22] Filed: Jul. 31, 1990

[51] Int. Cl.⁵ ............................................. A01K 31/06
[52] U.S. Cl. ........................................ 119/17; 119/23
[58] Field of Search ........................ 119/17, 18, 21, 23

[56] References Cited

U.S. PATENT DOCUMENTS

| | | | |
|---|---|---|---|
| 429,196 | 6/1890 | Leonard | 119/17 |
| 459,396 | 9/1891 | Gilbert | 119/17 |
| 1,186,782 | 6/1916 | Hercer | 119/17 |
| 1,460,102 | 6/1923 | Leon | 119/17 |
| 2,045,472 | 6/1936 | Kearney et al. | 119/17 |
| 2,178,117 | 10/1939 | Hillensh | 119/17 |
| 2,539,024 | 1/1951 | Leiby | 119/17 |

FOREIGN PATENT DOCUMENTS

| | | | |
|---|---|---|---|
| 241598 | 12/1911 | Fed. Rep. of Germany | 119/17 |
| 9506 | of 1888 | United Kingdom | 119/17 |

Primary Examiner—Paul J. Hirsch
Attorney, Agent, or Firm—Joseph C. Mason, Jr.; Ronald E. Smith

[57] ABSTRACT

A seed guard that is detachably securable to any bird cage and which deflects thrown seeds back into the cage. The guard includes as many flat, cuttable sheets as there are sides to the cage. The opposite ends of each cuttable sheet are engaged by corner members that are detachably secured to the corner bars of the cage. The seed guard is provided in kit form so that the cage owner may assemble the corner members, attach them to the cage, cut the guard members to size, and slide the guard members into position by inserting the opposite ends of the guard members into detents provided by the corner members.

11 Claims, 2 Drawing Sheets

SEED GUARD FOR BIRD CAGES

TECHNICAL FIELD

This invention relates, generally, to bird cages. More particularly, it relates to an attachment to bird cages that provides a seed guard to prevent disbursal of seeds out of the cage.

BACKGROUND ART

Bird feed is kept in a small container that is positioned inside the bird cage. The container is typically mounted to the base of the cage at an outer perimeter thereof, at a level where the imperforate walls of the base end and the bars of the cage begin. As every bird owner knows, both seeds and hulls are thrown out of the cage every day, thereby necessitating the sweeping or vacuuming of the floor thereunder.

Several inventors have turned their attention to this problem. U.S. Pat. No. 1,186,782 to Hercer shows a bird cage screen detachably secured to a bird cage that is operative to catch seeds or hulls thrown from the cage. The screen is opaque and thus obstructs the owner's view into the cage. More importantly, it is releasably secured to the cage by hook members which are detachable by the bird within the cage. Moreover, the screen is not easily adaptable to cages of differing sizes, nor can a single panel thereof be removed to the exclusion of the remaining panels.

Another interesting limitation of the Hercer feed screen is that it is of rectangular frame-like construction and must be lowered into position from the top of the cage. Thus, the Hercer construction would have no utility in connection with some modern cages that are wider at the top than at the bottom.

Still another drawback of said earlier-patented screen is that the screens are ultimately held into their operable configuration by gravity only. Thus, an active bird or birds can cause the cage to swing and thereby cause detachment of the screen therefrom.

Modern cages are also provided with a plurality of lift doors positioned on the front of the cage to permit the bird owner to easily fill the seed or water containers by simply momentarily lifting the selected door. The entire Hercer seed guard would require removal if access to such a lift door were desired.

Many other early patents in this field share some of the same limitations. For example, German patent No. 241598 also requires removal of the four seed guards as a unit if access to a lift door is desired.

U.S. Pat. No. 9,506 shows a bird cage design that includes a seed catcher slung below the base of the bird cage. The catcher is non-adjustable and can be detached by the cage occupant.

It is therefore clear that an adjustable-in-size seed guard that attaches to a bird cage in such a way that no bird can remove it would be a desirable item which the average bird owner would purchase if such a guard were commercially available, but the prior art, taken as a whole, neither provides the needed guard, nor does it teach or suggest how such a seed guard could be provided.

DISCLOSURE OF INVENTION

The very longstanding but heretofore unfulfilled need for a seed guard that is attachable to any bird cage, which need not be completely disassembled to permit the owner to open a lift door, which cannot be detached from the cage by a bird and which does not obstruct the view into the cage is now fulfilled by a construction including corner members that snap fittingly engage the corners of a cage and including transparent seed guards which may be cut to size to fit a cage of any dimension or configuration.

The novel construction has a total of twelve parts; four elongate, flexible transparent seed guards, one for each side of a four-sided cage, and four corner pieces of two parts each.

Each corner piece includes a horizontally disposed top part that snap fittingly engages a cage corner bar and a bottom part disposed about forty five degrees from the horizontal that also snap fittingly engages a cage corner bar; the two parts of each corner piece snap fittingly engage each other away from the cage so that the free or leading ends of each corner member engage the same corner bar at vertically spaced locations. Thus, each corner bar and the two parts secured thereto form a strong, triangular assembly that cannot be removed from the cage directly by a bird or indirectly by gravity acting on a swinging cage.

Transparent sheets of flat, flexible but substantially rigid material are cut to size and the opposite ends thereof are slidably received and retained between a sheet-retaining detent of the lower part of the each corner member. Thus, the corner members are attachable to cages of any size and the guard sheet positioned therebetween is cuttable to any size. Removal of a single guard sheet is the only disassembly required when it is desired to lift a lift door on the cage.

The novel assembly does not affect the conventional sliding drawer positioned in the base of a standard cage which when removed allows cleaning of the cage. It does deflect seeds thrown by the bird or birds back into the interior of the cage, i.e., the thrown seeds or hulls hit the sidewalls of the seed guard and slide therefrom to the floor of the cage, not to the homeowner's floor.

A primary object of this invention is to advance the art of bird cage design by providing an assembly of parts that may be provided as original equipment on a bird cage or which may be retrofit onto existing cages for the purpose of preventing cage occupants from disbursing seeds and hulls from the cage.

Another important object is to provide such an apparatus that will fit a bird cage of any size or shape.

These and other important objects, advantages, and features of the invention will become as this description proceeds.

This invention is clearly new and useful. Moreover, it was not obvious to those of ordinary skill in the art at the time it was made, in view of the prior art, taken as a whole.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which.

BEST MODES FOR CARRYING OUT THE INVENTION

Figure 1:
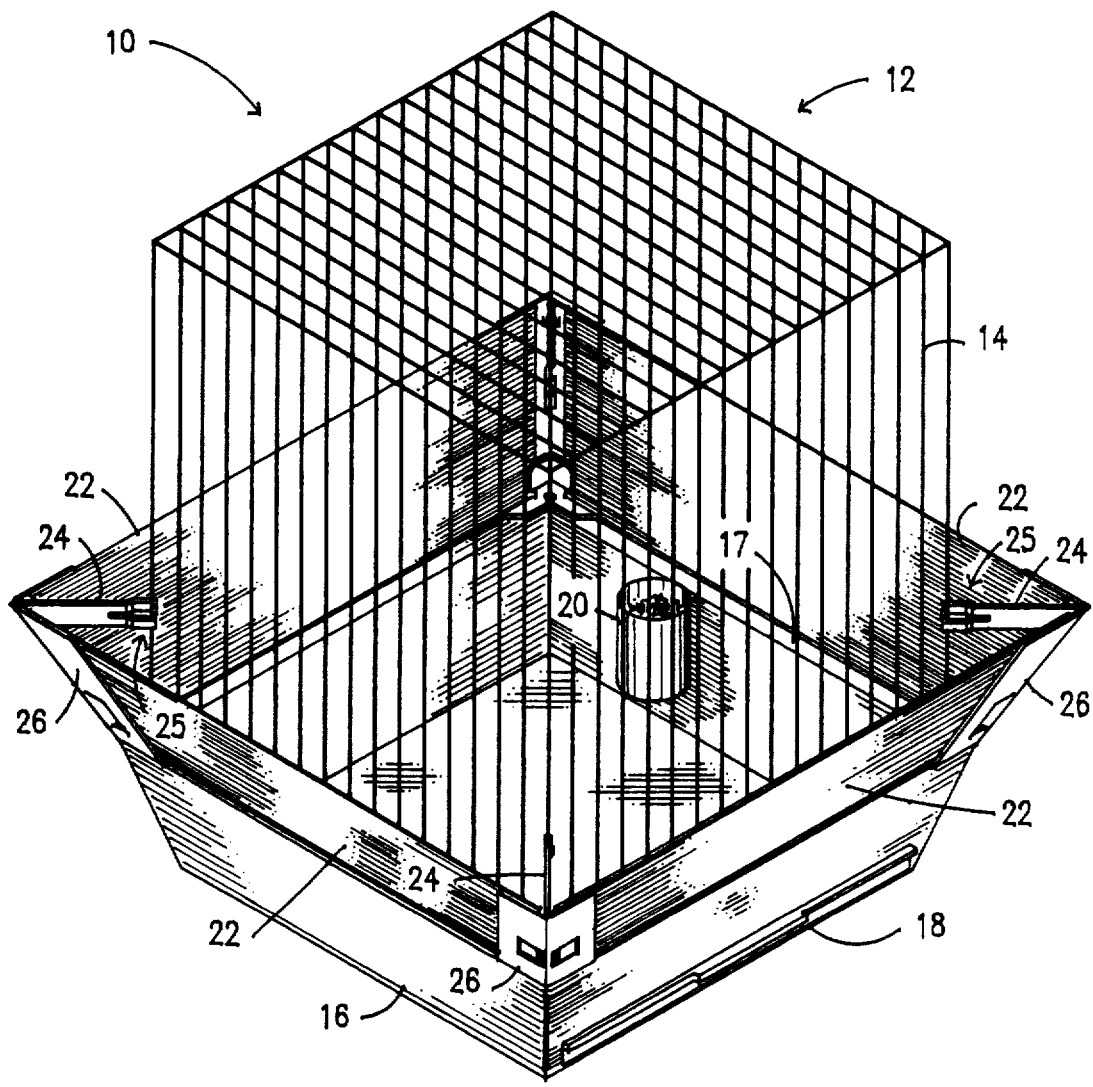
FIG. 1 is a perspective view of an exemplary embodiment of the invention.

Referring now to FIG. 1, it will there be seen that a bird cage equipped with the novel seed guard is denoted as a whole by the reference numeral 10.

Cage 12 is of conventional construction and includes bars 14, base 16 and drawer 18 which may be opened to clean the cage. A cylindrical seed holder 20 is positioned at the lower end of the bars, i.e., the rim of holder 20 is co-planar with the top edge of base 16.

The novel apparatus depicted includes four, flat, flexible, preferably transparent and cuttable sheet members or guards, collectively denoted 22. It should be understood, however, that there are as many seed guards 22 as there are sides to cage 12. When there are four guards 22 as in the illustrated embodiment, each guard 22 is cut at a forty five degree angle at its opposite ends so that it clearly abuts the contiguous edges of the guard members disposed at its opposite ends.

Each guard member 22 is also preferably disposed at about a forty five degree angle relative to a horizontal plane, as shown, although different angular orientations are well within the scope of this invention.

In a commercial embodiment of this invention, guards 22 are provided in a single elongate piece, and the customer cuts such elongate guard to size in accordance with the specific dimensions of the cage owned by the customer.

The customer is also required to install the support members that hold the guards 22 after they have been cut to size, but as will be seen, such installation is accomplished without tools.

More particularly, the guard supports are snap fit onto the corner bars of the cage and may therefore by called corner members.

Figure 2:
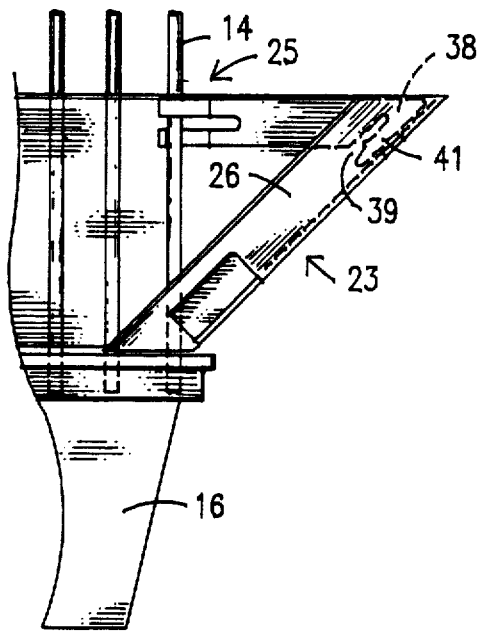
FIG. 2 is a side eleuctional view of a corner member attached to a corner bar of a cage.
Figure 3:
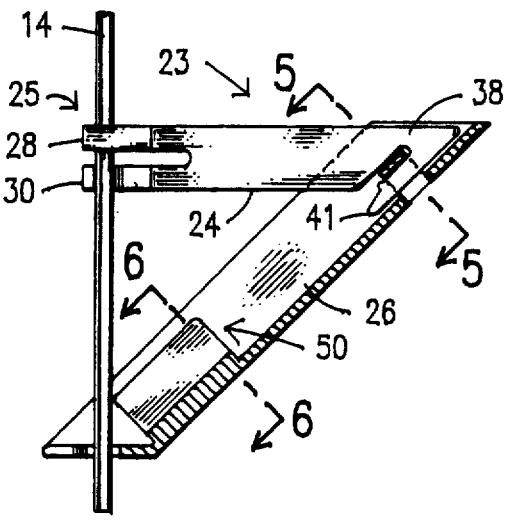
FIG. 3 is a partially sectional view of the same parts depicted in FIG. 2.

The construction of each corner member is perhaps best shown in FIGS. 2–6. Each member 23 has two primary parts, i.e., horizontally disposed part 24 and descending part 26 which is angled forty five degrees with respect thereto as best shown in FIGS. 2 and 3.

Figure 4:
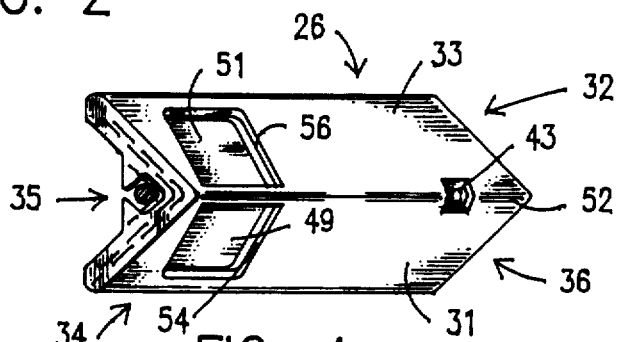
FIG. 4 is an isometric view of the descending part of the corner member depicted in FIGS. 2 and 3.
Figure 5:
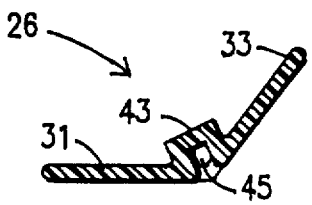
FIG. 5 is a transverse sectional view taken along line 5—5 in FIG. 3.

Part 24 is essentially flat whereas part 26 is "V"-shaped as best shown in FIG. 4. The leading end 25 of part 24 is bifurcated as shown; more particularly, said leading end terminates in flexible fingers 28 and 30, each of which is bent as depicted. Thus, an easy snap fit connection is made by applying a slight twist to part 24 to engage it to its associated corner bar.

Descending part 26 includes base 32 of "V"-shaped construction; the leading end 34 of base 32 is adapted to snap fittingly engage its associated cage corner bar as shown in FIG. 4. More particularly, a confronting pair of resilient tabs close the opening of a cavity that receives a corner bar as shown in that Fig. The tabs are transiently displaced away from one another when the bar is urged into the cauity, and their resiliency recloses the cauity upon entry of the bar thereinto, thereby releasably capturing said bar.

The trailing end 38 of part 24 and the trailing end 36 of part 26 are also snap fittingly engaged to one another as at 40. More particularly, slot 39 (FIG. 2), formed in trailing end 38 of part 24, receives detent 43 which is punched out (see FIG. 4) of the trailing end 36 of descending part 23, i.e., part 41 (FIGS. 2 and 3) extends through opening 45 (FIG. 5), created by said punching, to thereby interlock said horizontal and descending parts.

Figure 6:
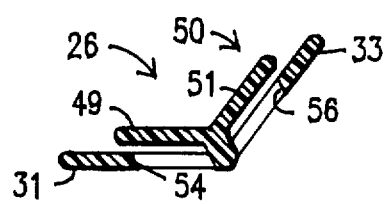
FIG. 6 is a transverse sectional view taken along line 6—6 in FIG. 3.

A retaining flange 50 is provided near the leading end 34 of part 26; the flange 50, like base 26, exhibits bilateral symmetry, i.e., each part thereof lies on an opposite side of the longitudinal axis of symmetry 52 of base member 32. It is disposed in closely spaced, parallel relation to base 32 as shown in FIG. 6, and it cooperates with said base 32 (having wings 31, 33) to press-fittingly hold the opposite ends of each cut-to-size guard member 22.

The manner of use of the novel apparatus should now be apparent. The cage owner simply assembles the four corner members 23 by snapping together their respective trailing ends 36, 38, snapping their respective leading ends 25, 34 to their associated corner bars of the cage so that the leading end of the "V"-shaped base member 32 is disposed in vertically spaced relation downwardly of the leading end 25 of flat part 24, cutting each guard member 22 to size and sliding the opposite ends of each guard member between its associated flange 50 and base member 32.

This procedure is obviously quite simple due to the highly developed and perfected structure of the invention.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described, what is claimed is:

1. A seed guard assembly for a bird cage, comprising:
   at least a pair of corner members;
   each of said corner members adapted to releasably engage a corner bar of a bird cage at vertically spaced apart locations thereon;
   at least one elongate, flat sheet of cuttable material;
   each of said corner members adapted to releasably engage opposite ends of said at least one flat sheet;
   whereby a pair of corner members are engaged to adjacent corner bars of a bird cage and said flat sheet of material is cut to size and positioned in interconnecting relation therebetween to form a barrier that prevents seeds and hulls from being thrown from said cage.

2. The assembly of claim 1, wherein each corner member includes a first elongate, generally flat part and a second elongate, generally "V"-shaped part and wherein said first and second parts are releasably coupled to one another at respective trailing ends thereof.

3. The assembly of claim 2, wherein said first and second parts are angularly disposed relative to one another at a predetermined angle.

4. The assembly of claim 3, wherein said predetermined angle is about forty five degrees.

5. The assembly of claim 4, wherein said first part is substantially horizontally disposed when a leading end thereof is releasably engaged to a preselected corner bar of said cage, wherein said leading end is bifurcated to facilitate releasable engagement to said corner bar and wherein a trailing end thereof is releasably coupled to a trailing end of said second part.

6. The assembly of claim 5, wherein said second part has a leading end adapted to releasably engage said corner bar and a trailing end releasably coupled to said trailing end of said first part, and wherein said second part includes a base member and a flange member disposed in closely spaced relation to one another to slidingly accommodate an associated end of said flat sheet of cuttable material therebetween.

7. The assembly of claim 1, wherein said at least one sheet of cuttable material is transparent.

8. A seed guard assembly for a bird cage, comprising:
a predetermined plurality of corner members, there being as many corner members as there are sides to said bird cage;
each of said corner members having a first part and second part;
each of said first parts having a leading end of bifurcated construction to facilitate releasable attachment to a preselected corner bar of said cage;
each of said second parts having a leading end of bifurcated construction to facilitate releasable attachment to a preselected corner bar of said cage;
each of said first and second parts being releasably coupled to one another at their respective trailing ends;
each of said first parts being horizontally disposed when attached to its associated corner post;
each of said second parts being disposed at a substantially forty five degree angle relative to its associated first part when attached to its associated corner bar;
said respective leading ends of said first and second corner members being disposed in vertically spaced relation to one another; and
a plurality of flat seed guard members being disposed in interconnecting relation between adjacent corner members;
each of said second parts being adapted to releasably engage opposite ends of said seed guard members.

9. The assembly of claim 8, wherein each of said second parts includes an elongate, generally "V"-shaped base member.

10. The assembly of claim 9, wherein each base member includes a pair of detent members disposed on opposite sides of a longitudinal center line of their associated base member, said detent members being positioned in closely spaced relation to their associated base members so that an end of a said seed guard member is slidably and snugly received between each closely spaced detent member and associated base member each said seed guard member being disposed at a substantially forty five degree angle to the horizontal to deflect thrown seeds back into said cage.

11. The assembly of claim 8, wherein at least of said one of said seed guard members is transparent.

* * * * *